(12) United States Patent
Tanaka

(10) Patent No.: US 8,098,315 B2
(45) Date of Patent: Jan. 17, 2012

(54) SOLID STATE IMAGING APPARATUS, SOLID STATE IMAGING DEVICE DRIVING METHOD AND CAMERA

(75) Inventor: Hiroaki Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 12/429,035

(22) Filed: Apr. 23, 2009

(65) Prior Publication Data

US 2009/0278968 A1 Nov. 12, 2009

(30) Foreign Application Priority Data

May 12, 2008 (JP) .................................. 2008-124250

(51) Int. Cl.
*H04N 5/335* (2006.01)
(52) U.S. Cl. ....................................................... 348/311
(58) Field of Classification Search .................. 348/311, 348/312, 294, 295, 296, 297
See application file for complete search history.

(56) References Cited

U.S. PATENT DOCUMENTS 6,507,365 B1 * 1/2003 Nakamura et al. ............ 348/296

FOREIGN PATENT DOCUMENTS

| JP | 10-144907 | 5/1998 |
| JP | 2003-153087 | 5/2003 |

* cited by examiner

*Primary Examiner* — Hung Dang
(74) *Attorney, Agent, or Firm* — Robert J. Depke; Rockey, Depke & Lyons, LLC

(57) ABSTRACT

A solid state imaging apparatus includes a solid state imaging device and a control circuit for performing control such that a first clock signal applied to transfer signal charges for a time period from after a preceding signal charge has been read out from a light sensing unit to when the preceding signal charge is transferred to a horizontal transfer unit and a second clock signal applied for a time period from after the preceding signal charge has been transferred to the horizontal transfer unit to when a succeeding signal charge is read out from the light sensing unit have almost the same amplitude and a high level potential of the first clock signal is set higher than that of the second clock signal.

4 Claims, 6 Drawing Sheets

SOLID STATE IMAGING APPARATUS, SOLID STATE IMAGING DEVICE DRIVING METHOD AND CAMERA

BACKGROUND OF THE INVENTION

1. Field of the Invention

The present invention relates to a solid state imaging apparatus, a solid state imaging device driving method and a camera and more particularly to a solid state imaging apparatus, a solid state imaging device driving method and a camera configured to realize dark signal level reduction.

2. Description of the Related Art

In a camera such as a digital still camera or a security camera, a CCD (Charge Coupled Device) type image sensor of an inter-line transfer system has been widely used.

FIG. 3 is a schematic diagram illustrating a CCD type image sensor of the inter-line transfer system. In the example shown in FIG. 3, a CCD type image sensor 101 includes a plurality of light sensing units 102 arrayed in a matrix, a read-out gate 103 disposed adjacent to each light sensing unit and configured to read out a signal charge input using the light sensing unit, a vertical transfer unit 104 disposed adjacent to the read-out gate and configured to transfer the signal charge read-out using the read-out gate in a vertical direction, a horizontal transfer unit 105 configured to transfer the signal charge transferred from the vertical transfer unit in a horizontal direction and a channel stop area (not shown in FIG. 3) disposed on the opposite side of the read-out gate of the light sensing unit and configured to reduce color mixing (for example, see Japanese Laid-Open Patent Publication No. 10-144907). The signal charge which has been transferred in the horizontal direction using the horizontal transfer unit 105 is then transferred to a floating diffusion (FD) unit 106 incorporated into an output unit. A variation in the potential of the FD unit is detected using a MOS transistor and converted into an electric signal. Then, the electric signal is amplified and output as a video image signal Vout.

Operations of the CCD type image sensor of the inter-line transfer system configured as mentioned above are classified into [1] photoelectric conversion and signal charge storage performed using the light sensing unit (a photodiode) 102, [2] transfer (field shifting) of signal charges from the light sensing unit 102 to the vertical transfer unit 104, [3] signal charge transfer (vertical transfer) performed using the vertical transfer unit 104, [4] transfer (line shifting) of signal charges from the vertical transfer unit 104 to the horizontal transfer unit 105, [5] signal charge transfer (horizontal transfer) performed using the horizontal transfer unit 105 and [6] signal charge detection and amplification performed using the FD unit 106. Next, the above mentioned operations will be described in detail.

[1] Photoelectric Conversion and Signal Charge Storage Performed Using the Light Sensing Unit (Photodiode)

An optical image which has been imaged through an imaging lens disposed on the front surface side of the CCD type image sensor 101 is converted into a charged image using the light sensing unit 102. That is, in each light sensing unit 102, a signal charge is stored in accordance with an intensity of received light and a time when the light has been received.

[2] Field Shifting

The signal charges stored in the respective light sensing units 102 are simultaneously read out to the vertical transfer unit 104 at a predetermined timing, which is referred to as "field shifting".

Specifically, first, in an odd-numbered field, signal charges of vertically arrayed odd-numbered pixels (the light sensing units 102) are added to signal charges of vertically arrayed even-numbered pixels (the light sensing units 102) to be read out. In the next even-numbered field, by changing the combination of pixels to be added together, signal charges of vertically arrayed even-numbered pixels (the light sensing units 102) and signal charges of vertically arrayed odd-numbered pixels (the light sensing units 102) are added together and are read out. That is, two vertically adjacent pixels are added together to form one field using the vertical transfer unit 104 and then another field is formed by changing the combination of pixels to be added together, by which one frame is completed. Incidentally, such a reading method as mentioned above is referred to as a "field reading" technique which is widely adopted in the field of video cameras in order not to leave a frame afterimage behind.

[3] Vertical Transfer

The signal charges which have been field-shifted to the vertical transfer unit 104 are then vertically transferred using the vertical transfer unit 104. In the transfer using the vertical transfer unit 104, signal charges of respective lines are transferred downward (toward the horizontal transfer unit 105) in parallel in units of lines.

[4] Line-Shifting

The signal charges of one line which have been transferred to the undermost stage of the vertical transfer unit 104 are then transferred in parallel to the horizontal transfer unit 105 in the lamp, which is referred to as "line-shifting".

[5] Horizontal Transfer

The signal charges of one line which have been line-shifted to the horizontal transfer unit 105 are then horizontally transferred using the horizontal transfer unit 105. When the horizontal transfer unit 105 changes so as to be in a vacant state with no signal charge left therein at the completion of horizontal transfer of signal charges of one line, signal charges of the next one line are line-shifted to the horizontal transfer unit 105 from the vertical transfer unit 104.

[6] Signal Charge Detection and Amplification

The signal charges which have been horizontally transferred to the left end (the terminating end) of the horizontal transfer unit 105 are detected in terms of voltages pixel by pixel and amplified using the FD unit 106 and are then output from its output terminal.

Incidentally, the above mentioned operations [1] to [6] are performed interrelated with one another. As soon as the signal charges of one line which have been vertically transferred from the undermost stage of the vertical transfer unit 104 are line-shifted to the horizontal transfer unit 105, horizontal transfer thereof is started and the signal charges are sequentially detected and read out pixel by pixel using the FD unit 106. Line shifting and vertical transfer of signal charges are performed simultaneously. That is, when all the signal charges of one line have been read out from the horizontal transfer unit 105, signal charges of the next one line which have been vertically transferred down to the undermost stage are line-shifted to the horizontal transfer unit 105 and are then horizontally transferred. By repeating the above mentioned operations, all the signal charges in one field are read out.

Photoelectric conversion is still being continuously performed while the signal charges are being transferred in the above mentioned manner and storage of signal charges is again started in respective light sensing units (photodiodes) 102 immediately after the signal charges have been field-shifted. That is, although immediately after the signal charges have been transferred to the vertical transfer unit 104 by field-shifting, each light sensing unit (photodiode) 102 changes so as to be in a vacant state, light is continuously emitted to respective light sensing units (photodiodes) and hence charges are again stored therein.

FIG. 4 is a schematic diagram for illustrating a sectional structure taken along IV-IV line of the pixel region shown in FIG. 3. On the surface of a P-type well area 119 formed on an N-type silicon substrate 110, N-type signal charge storage areas 126 constituting the light sensing unit 102, N-type charge transfer areas 124 constituting the vertical transfer unit 104 and P$^+$-type channel stop areas 118 are formed.

A P$^{++}$-type positive charge storage area 127 is formed on the surface of the signal charge storage area 126 and a P-type area interposed between the signal charge storage area 126 and the charge transfer area 124 constitutes the read-out gate 103. A gate insulating film 123 made of, for example, $SiO_2$ is formed on the charge transfer area 124, the read-out gate 103, the positive charge storage area 127 and the channel stop area 118. A transfer electrode 125 is formed on the charge transfer area 124 via the gate insulating film 123.

Then, signal charges stored in the light sensing unit 102 are field-shifted to the adjacent vertical transfer unit 104 via the read-out gate 103. The signal charges which have been line-shifted from the vertical transfer unit 104 and then horizontally transferred from the horizontal transfer unit 105 flow into the FD unit 106 whose potential is, then, changed in accordance with the amount of stored signal charge. Incidentally, a signal (a voltage) detected at the FD unit is very small, so that a source follower circuit (constituted by a plurality of stages of MOS transistors) is connected to the FD unit 106 and the signal (voltage) detected at the FD unit 106 is amplified and output to the outside using the source follower circuit.

Incidentally, in recent digital still cameras, a tendency has been observed that the pixel size decreases with increasing resolution (increasing the number of pixels). As the pixel size decreases, (1) the sensitivity and the level of output signals such as the quantity of saturating signals are reduced and (2) the number of noise components is increased in order to obtain output signals with certainty, which may result in a decrease in SN ratio (Signal to Noise Ratio) and hence induce deterioration of image quality.

Various kinds of methods are now being developed so as to increase the sensitivity and the quantity of saturating signals with no increase in noise components and to reduce noise. In particular, from the viewpoint of noise reduction, the reduction in level of dark signals constituting most noise components in a solid state imaging device has become important.

The CCD type image sensor as mentioned above is widely used in various kinds of cameras such as security cameras and cameras for use in FA (Factory Automation) and in many cases a long-time light-exposing (sometimes, referred to as a low-speed shutter) mode is set in the cameras as mentioned above. Contrary to a "usual mode" in which field-shifting is performed per 1/60 sec in consideration of its application to a standard type TV, that is, the time period for which a signal charge is stored in the light sensing unit 102 is set to 1/60 sec, the "long-time light-exposing" mode is a mode in which signal charges are continuously stored in the light sensing unit 102 for one to two seconds or, in some case, for several seconds maximum, without performing reading-out (field-shifting) of signal charges from the light sensing unit 102. The long-time light-exposing mode is effective for performing image capture, in particular, in a dark field state. However, dark-signal-induced deterioration of image quality is noticeably observed in the long-time light-exposing mode.

As a technique for reducing the level of dark signals, a method of controlling a clock voltage applied to a vertical transfer unit and a timing at which the clock voltage is applied to the vertical transfer unit has been proposed. Next, examples of related dark signal level reducing techniques will be described with reference to the accompanying drawings.

First, FIG. 5A is a diagram showing a vertical transfer clock signal Vφ to be applied to a vertical transfer unit for a time period ranging from a light-exposing time period to a signal outputting time period in a usual situation where a dark signal number reducing technique is not used. In most commercially available CCD type image sensors, a middle bias voltage (VM) of a vertical transfer clock signal Vφ is set to 0[V] for the entire time period ranging from the light-exposing time period to the signal outputting time period. Here, a "middle bias voltage (VM)" denotes a high level potential of a clock voltage to be applied for vertical transfer of signal charges using the vertical transfer unit, that is, a high level potential set in the case that a read-out voltage is not taken into consideration. A time period D shown in FIG. 5A is a time period for which unnecessary signals generated upon light-exposure are swept.

On the other hand, as an example of the dark signal level reducing technique, a technique for negatively biasing (for example, VM=−0.5[V]) a middle bias voltage (VM) of a vertical transfer clock signal Vφ to be applied to a vertical transfer unit for the entire time period ranging from the light-exposing time period to the signal outputting time period has been proposed as shown in FIG. 5B.

In this connection, FIG. 6A is a diagram showing a relation between a middle bias voltage (VM) of a vertical transfer clock signal Vφ to be applied to a vertical transfer unit and the dark signal level. The level of dark signal is reduced by negatively biasing the middle bias voltage (VM) of the vertical transfer clock signal Vφ, so that dark signal level reduction is attained by negatively biasing the middle bias voltage (VM) of the vertical transfer clock signal Vφ to be applied to the vertical transfer unit for the entire time period ranging from the light-exposing time period to the signal outputting time period.

As another example of the dark signal level reducing technique, a technique for fixing a vertical transfer clock signal Vφ to be applied to a vertical transfer unit at a low level only for the light-exposing time period has been proposed as shown in FIG. 5C (see, for example, Japanese Laid-Open Patent Publication No. 2003-153087).

SUMMARY OF THE INVENTION

However, in the above mentioned examples of the dark signal level reducing techniques, the amount of charge that can be handled by the vertical transfer unit may be reduced or vertical transfer efficiency of the vertical transfer unit may be reduced.

That is, as shown by a relation between a middle bias voltage (VM) of a vertical transfer clock signal Vφ to be applied to a vertical transfer unit and the amount of charge that can be handled by the vertical transfer unit in FIG. 6B, the amount of charge that can be handled by the vertical transfer unit may be reduced by negatively biasing the middle bias voltage (VM) of the vertical transfer clock signal Vφ. In addition, as shown by a relation between a middle bias voltage (VM) of a vertical transfer clock signal Vφ to be applied to a vertical transfer unit and vertical transfer efficiency of the vertical transfer unit in FIG. 6C, the vertical transfer efficiency of the vertical transfer unit may be reduced by negatively biasing the middle bias voltage (VM) of the vertical transfer clock signal Vφ.

Therefore, in one example of the above mentioned dark signal level reducing technique, although dark signal level reduction is attained, the quantity of saturating signals is reduced and defective vertical transfer is liable to occur as the amount of charge that can be handled by the vertical transfer unit is reduced and as a result of which the increase in SN ratio may not be expected. In addition, the middle bias voltage (VM) of the vertical transfer clock signal Vφ to be applied to the vertical transfer unit is negatively biased for the entire time period ranging from the light-exposing time period to the signal outputting time period, so that defective vertical transfer may occur in a mode in which an image is displayed on a liquid crystal monitor (hereinafter, referred to as a liquid crystal monitor image displaying mode) and a moving image capturing mode necessitating high-speed transfer of signals charges using the vertical transfer unit.

On the other hand, in another example of the above mentioned dark signal level reducing technique, since the vertical transfer clock signal Vφ to be applied to the vertical transfer unit is fixed to the low level only for the light-exposing time period, dark signal level reducing effect may be obtained and there may be no adverse effect on the amount of charge that can be handled by the vertical transfer unit and the vertical transfer efficiency of the vertical transfer unit attained for the signal outputting time period. Therefore, this technique is adopted, in particular, in a long-time light-exposing mode in which dark signals may cause trouble.

In the long-time light-exposing mode, high-intensity light such as sunlight may be not incident, so that light incident in this mode will hardly cause trouble, if any. However, in the case that high-intensity light such as sunlight has been incident in a usual light-exposing mode, such trouble may occur that unnecessary charges stored in the vertical transfer unit are not thoroughly swept after the light-exposing time period has expired.

That is, since the vertical transfer clock signal Vφ to be applied to the vertical transfer unit is fixed at the low level only for the light-exposing time period, in other words, application of the vertical transfer clock signal Vφ to the vertical transfer unit is stopped for the light-exposing time period to fix the clock voltage at the low level, vertical transfer of signal charges may not be performed for the light-exposing time period and hence a number of signals may be remained in the vertical transfer unit. Thus, signal charges remained in the vertical transfer unit may not be thoroughly swept in a signal charge sweeping time period set before signal outputting is started.

In addition, in the case that application of the vertical transfer clock signal Vφ to the vertical transfer unit is stopped to fix the clock voltage at the low level for the light-exposing time period, vertical transfer of signal charges may not be utterly performed for the light-exposing time period and hence this technique has difficulty in coping with a mode such as the liquid crystal monitor image displaying mode.

The present invention has been conceived of in view of the above mentioned circumstances. Therefore, it is desirable to provide a solid state imaging apparatus, a solid state imaging device driving method and a camera configured to realize dark signal level reduction without reducing the amount of charge that can be handled by a vertical transfer unit and vertical transfer efficiency of the vertical transfer unit.

According to an embodiment of the present invention, there is provided a solid state imaging apparatus including a solid state imaging device having light sensing units arrayed in a matrix, a vertical transfer unit provided for each vertical array of the light sensing units and configured to read out signal charges from the light sensing units and transfer the read-out signal charges in a vertical direction, and a horizontal transfer unit configured to receive the signal charges transferred from the vertical transfer unit and transfer the transferred signal charges in a horizontal direction and a control circuit configured to control clock signals to be applied to the vertical transfer unit, wherein the control circuit performs control such that a first clock signal applied in order to transfer the signal charges for a time period from after a preceding signal charge has been read out from the light sensing unit to when the preceding signal charge is transferred to the horizontal transfer unit via the vertical transfer unit and a second clock signal applied for a time period from after the preceding signal charge has been transferred to the horizontal transfer unit to when a succeeding signal charge is read out from the light sensing unit have almost the same amplitude, and a high level potential of the first clock signal is set higher than that of the second clock signal.

According to another embodiment of the present invention, there is provided a camera including a solid state imaging device having light sensing units arrayed in a matrix, a vertical transfer unit provided for each vertical array of the light sensing units and configured to read out signal charges from the light sensing units and transfer the read-out signal charges in a vertical direction, and a horizontal transfer unit configured to receive the signal charges transferred from the vertical transfer unit and transfer the transferred signal charges in a horizontal direction, an optical system configured to guide incident light to an imaging area of the solid state imaging device and a control circuit configured to control clock signals to be applied to the vertical transfer unit, wherein the control circuit performs control such that a first clock signal applied in order to transfer the signal charges for a time period from after a preceding signal charge has been read out from the light sensing unit to when the preceding signal charge is transferred to the horizontal transfer unit via the vertical transfer unit and a second clock signal applied for a time period from after the preceding signal charge has been transferred to the horizontal transfer unit to when a succeeding signal charge is read out from the light sensing unit have almost the same amplitude, and a high level potential of the first clock signal is set higher than that of the second clock signal.

Here, by performing control so as to set the high level potential of the first clock signal higher than that of the second clock signal, dark signal level reduction is attained without adversely affecting the amount of charge that can be handled by the vertical transfer unit and vertical transfer efficiency of the vertical transfer unit.

According to a further embodiment of the present invention, there is provided a method of driving a solid state imaging device having light sensing units arrayed in a matrix, a vertical transfer unit provided for each vertical array of the light sensing units and configured to read out signal charges from the light sensing units and transfer the read-out signal charges in a vertical direction, and a horizontal transfer unit configured to receive the signal charges transferred from the vertical transfer unit and transfer the transferred signal charges in a horizontal direction, the method including the step of applying a first clock signal to the vertical transfer unit in order to transfer the signal charges for a time period from after a preceding signal charge has been read out from the light sensing unit to when the preceding signal charge is transferred to the horizontal transfer via the vertical transfer unit and applying a second clock signal to the vertical transfer unit for a time period from after the preceding signal charge has been transferred to the horizontal transfer unit to when a succeeding signal charge is read out from the light sensing unit, wherein the first clock signal has almost the same amplitude as the second clock signal and a high level potential of the first clock signal is set higher than that of the second clock signal.

Here, by performing control so as to set the high level potential of the first clock signal higher than that of the second clock signal, dark signal level reduction is attained without adversely affecting the amount of charges handled in the vertical transfer unit and the vertical transfer efficiency of the vertical transfer unit.

In a solid state imaging apparatus, a solid state imaging device driving method and a camera according to embodiments of the present invention, dark signal level reduction is realized without reducing the amount of charge that can be handled by the vertical transfer unit and the vertical transfer efficiency of the vertical transfer unit.

DESCRIPTION OF THE PREFERRED EMBODIMENTS

Next, preferred embodiments of the present invention will be described with reference to the accompanying drawings.

Figure 1:
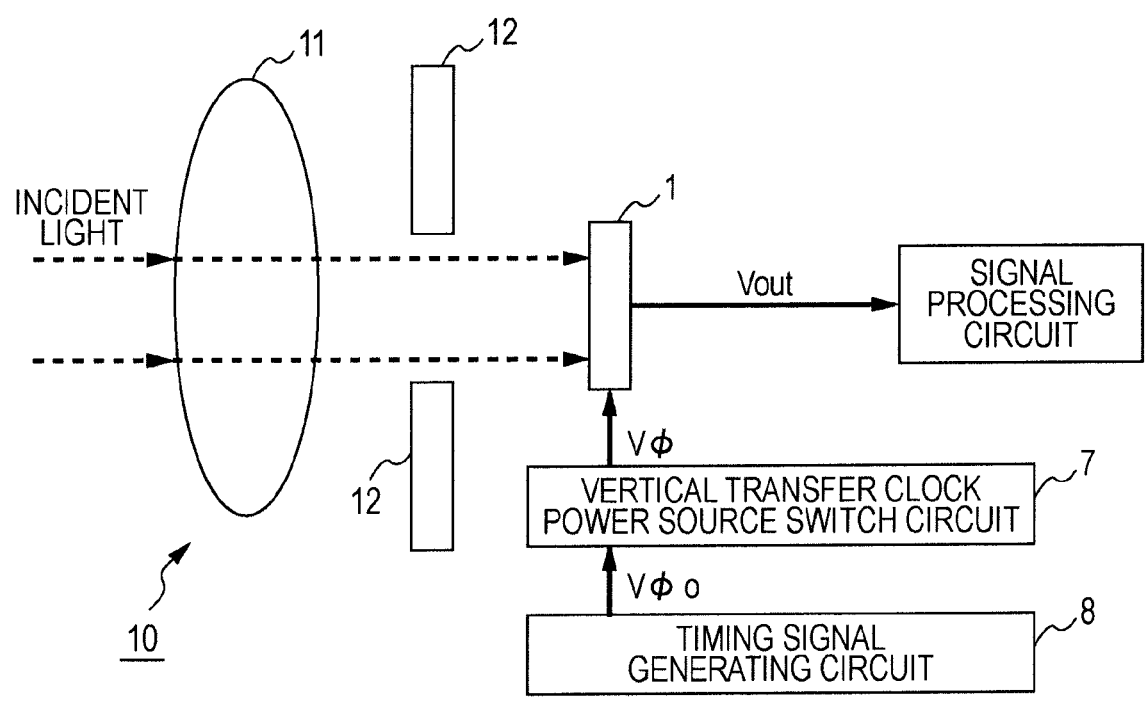
FIG. 1 is a schematic diagram illustrating a CCD type camera showing an example of a camera to which an embodiment of the present invention is applied.

FIG. 1 is a schematic diagram illustrating a CCD type camera showing an example of a camera to which an embodiment of the present invention is applied. A CCD type camera 10 shown in the drawing includes a lens 11 configured to focus incident light, a mechanical shutter 12 configured to pass the light focused through the lens 11 only for a predetermined time period and a CCD type image sensor 1 configured to capture an image of a subject which is projected through the lens 11 and the mechanical shutter 12.

Figure 2A:
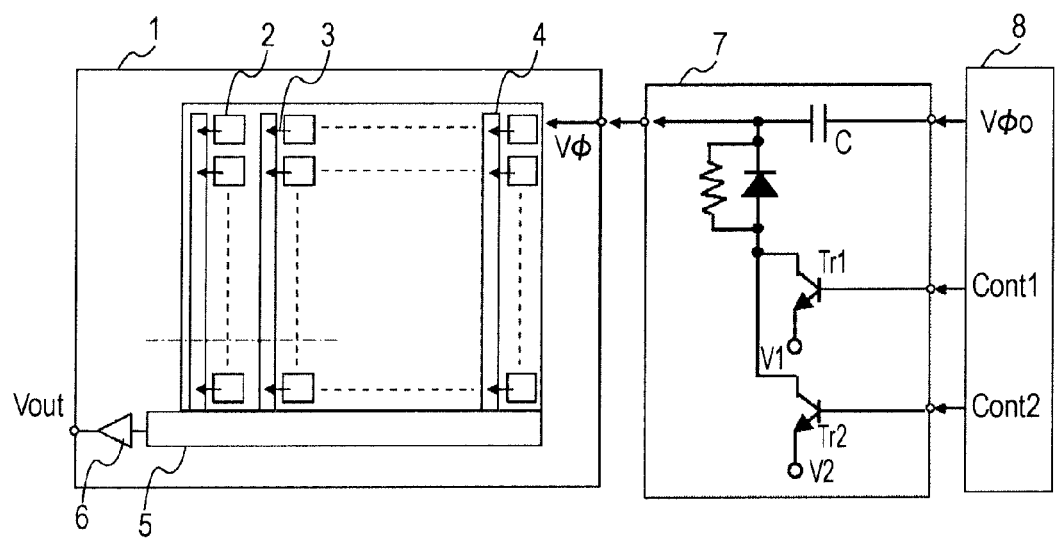
FIG. 2A is a schematic diagram of a CCD type image sensor showing an example of a solid state imaging apparatus to which an embodiment of the present invention is applied.

FIG. 2A is a schematic diagram illustrating a CCD type image sensor showing an example of a solid state imaging apparatus to which an embodiment of the present invention is applied. In a CCD type image sensor 1 shown in the drawing, a plurality of light sensing units 2 arrayed in a matrix, a read-out gate 3 disposed adjacent to each light sensing unit and configured to read out a signal charge which has been obtained using the light sensing unit, a vertical transfer unit 4 disposed adjacent to the read-out gate and configured to vertically transfer the signal charge read-out using the read-out gate, a horizontal transfer unit 5 configured to horizontally transfer the signal charge transferred from the vertical transfer unit and a channel stop area (not shown in FIG. 2) disposed on the opposite side of the read-out gate of the light sensing unit and configured to reduce color mixing, as in the case with the related CCD type image sensor as mentioned above are formed. The signal charge which has been horizontally transferred using the horizontal transfer unit 5 is transferred to an FD unit 6 incorporated into an output unit. A variation in the potential of the FD unit is detected using an MOS transistor and is converted into an electric signal which is, then, amplified and output as a video image signal Vout.

In addition, a vertical transfer clock power source switch circuit 7 configured to control a vertical transfer clock signal $V\phi$ to be applied to the vertical transfer unit 4 is also provided. A middle bias voltage (VM) of a vertical transfer clock signal $V\phi_0$ to be input from a timing signal generating circuit 8 is negatively biased to generate a vertical transfer clock signal $V\phi$ to be applied to the vertical transfer unit 4 using the vertical transfer clock power source switch circuit.

Specifically, in the vertical transfer clock power source switch circuit, an input terminal through which a vertical transfer clock signal $V\phi_0$ is applied is connected to an output terminal via a capacitor C and the output terminal is connected to a first power source $V_1$ (for example, V1=−7.5 [V] as a power source for VM=0[V]) via a first switch transistor (Tr1) and connected to a second power source $V_2$ (for example, V2=−9.5 [V] as a power source for VM=−1.0 [V]) via a second switch transistor (Tr2). A first control terminal Cont1 is connected to a gate electrode of the first switch transistor and a second control terminal Cont2 is connected to a gate electrode of the second switch transistor. In the vertical transfer clock power source switch circuit configured as mentioned above, when a high level potential is applied to the first control terminal Cont1, the first switching transistor turns to a conductive state to output a vertical transfer clock signal $V\phi$ whose middle bias voltage (VM) is set to 0[V] from its output terminal. When a high level potential is applied to the second control terminal Cont2, the second switching transistor turns to a conductive state to output a vertical transfer clock signal $V\phi$ whose middle bias voltage (VM) is set to −1.0[V] from its output terminal.

Potentials to be applied to the control terminals (the first control terminal and the second control terminal) of the vertical transfer clock power source switch circuit are controlled using the timing signal generating circuit. That is, for a signal outputting time period (from after a preceding signal charge has been read out from a light sensing unit to when the preceding signal charge is transferred to a horizontal transfer unit via a vertical transfer unit), a high level potential is applied to the first control terminal Cont1 and a low level potential is applied to the second control terminal Cont2. On the other hand, for a light-exposing time period (from after the preceding signal charge has been transferred to the horizontal transfer unit to when a succeeding signal charge is read out from the light sensing unit), a low level potential is applied to the first control terminal Cont1 and a high level potential is applied to the second control terminal Cont2.

Incidentally, in the above mentioned embodiment, the case where the vertical transfer clock signal $V\phi_0$ generated using the timing signal generating circuit is input into the vertical transfer clock power source switch circuit and the vertical transfer clock signal Vϕ controlled using the vertical transfer clock power source switch circuit is input into the CCD type image sensor has been described by way of example. However, it is sufficient to apply the vertical transfer clock signal Vϕ whose middle bias voltage (VM) has been negatively biased to the CCD type image sensor only for the light-exposing time period, and the vertical transfer clock power source switch circuit may be built into either the timing signal generating circuit or the CCD type image sensor.

Likewise, as long as the vertical transfer clock signal Vϕ whose middle bias voltage (VM) has been negatively biased is allowed to be applied to the CCD type image sensor only for the light-exposing time period, the circuit configuration of the vertical transfer clock power source switch circuit is not limited to that shown in FIG. 2A by way of example, but any configuration may be adopted.

Figure 6A:
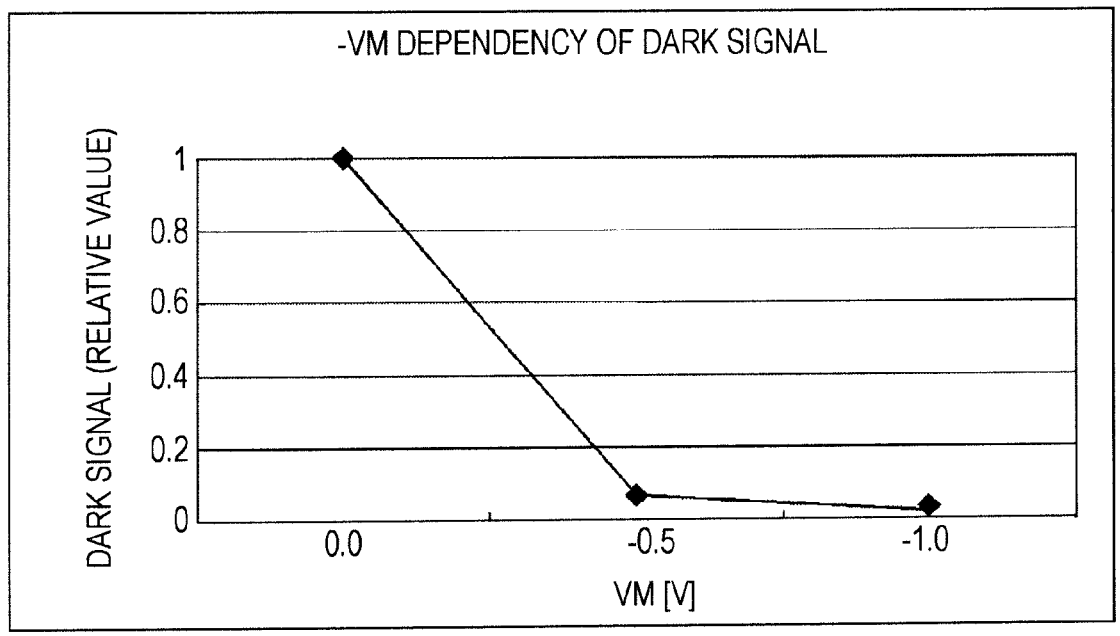
FIG. 6A is a graph showing a relation between a middle bias voltage (VM) of a vertical transfer clock signal $V\phi$ to be applied to a vertical transfer unit and a dark signal generated.
Figure 6B:
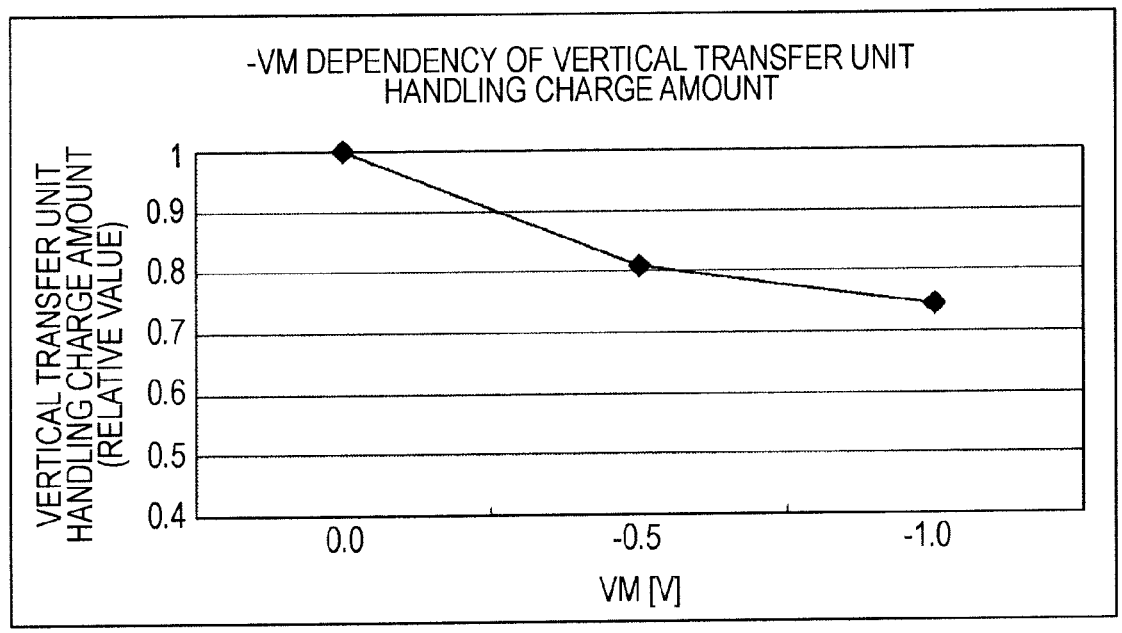
FIG. 6B is a graph showing a relation between a middle bias voltage (VM) of a vertical transfer clock signal $V\phi$ to be applied to a vertical transfer unit and the amount of charge that can be handled by the vertical transfer unit.
Figure 6C:
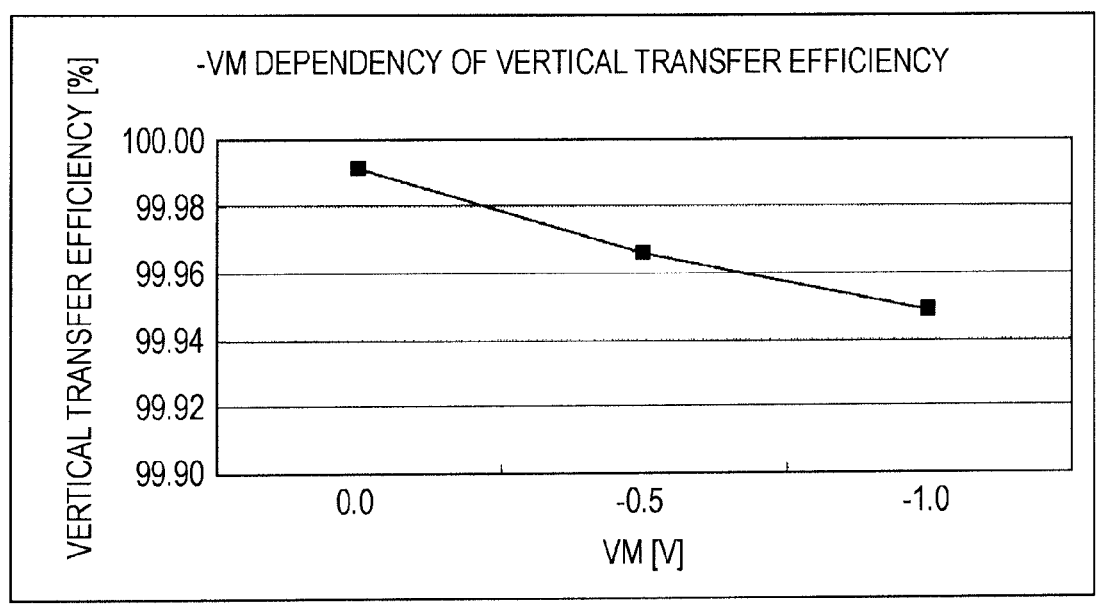
FIG. 6C is a graph showing a relation between a middle bias voltage (VM) of a vertical clock signal $V\phi$ to be applied to a vertical transfer unit and vertical transfer efficiency of the vertical transfer unit.

In addition, in the above mentioned embodiment, the case where the middle bias voltage (VM) is set to 0[V] for the signal outputting time period and the middle bias voltage (VM) is set to −1.0[V] for the light-exposing time period has been described by way of example. However, it is sufficient to set the middle bias voltage (VM) set for the light-exposing time period to be lower than the middle bias voltage (VM) set for the signal outputting time period. In general, considering the fact that 0[V] is adopted as the value of middle bias voltage (VM) set for the signal outputting time period, and considering an example in FIG. 6A showing a relation between a middle bias voltage (VM) of a vertical transfer clock signal and a dark signal generated, it is thought to be preferable that the middle bias voltage (VM) is lower than −0.5[V].

Figure 2B:
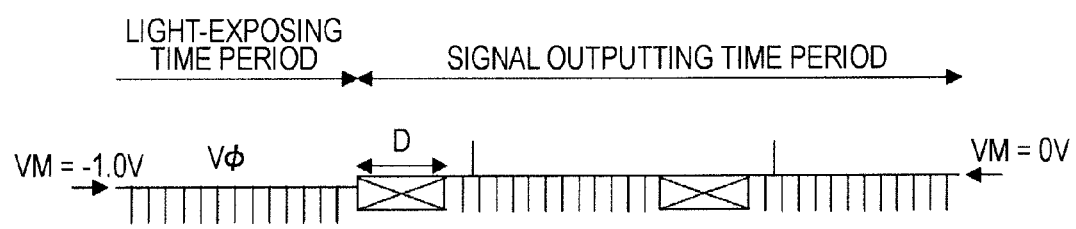
FIG. 2B is a schematic diagram illustrating a vertical transfer clock signal $V\phi$.
Figure 3:
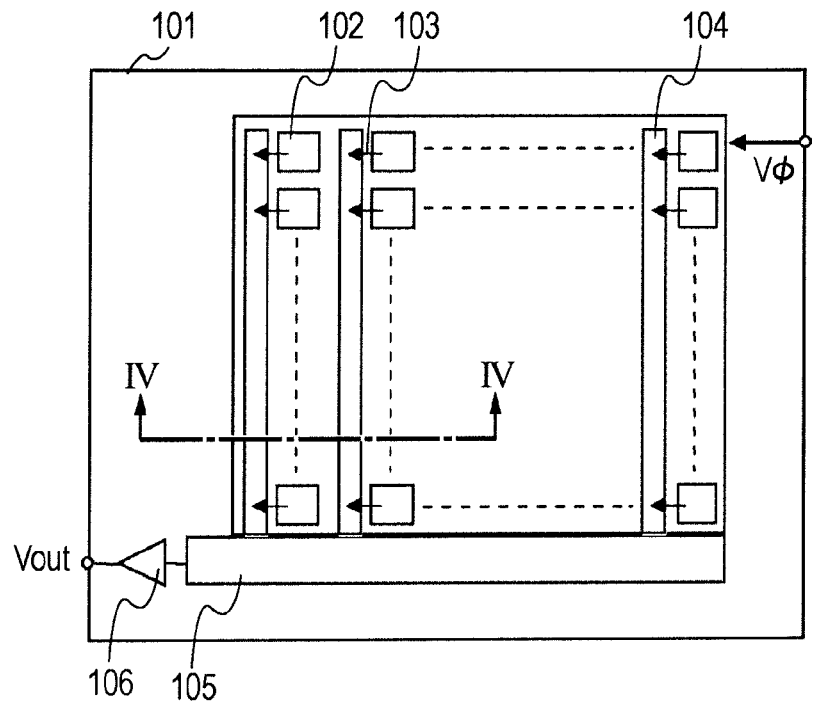
FIG. 3 is a schematic diagram illustrating an inter-line transfer system CCD type image sensor.
Figure 4:
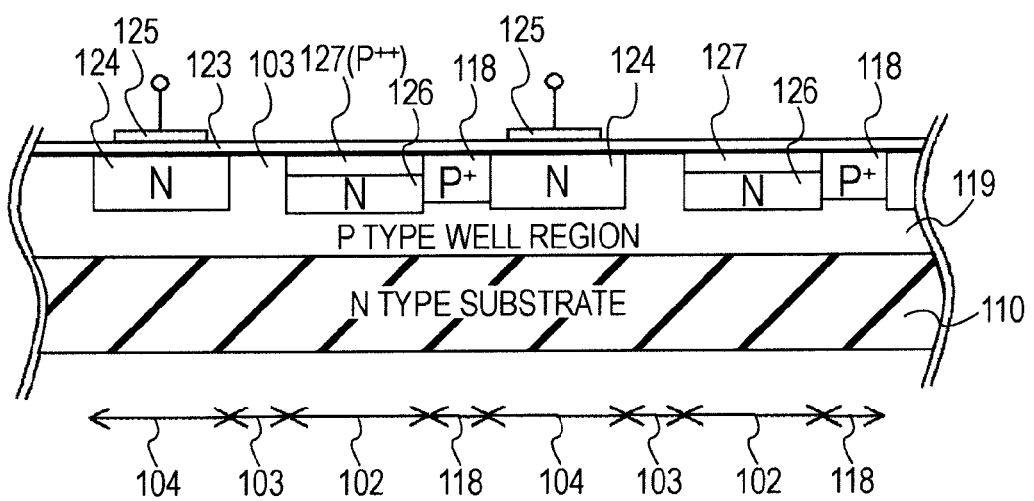
FIG. 4 is a schematic diagram illustrating a sectional structure taken along IV-IV line of the pixel region shown in FIG. 3.

In the CCD type camera configured as mentioned above, using the timing signal generating circuit, for the signal outputting time period, a high level potential is applied to the first control terminal Cont1 to output a vertical transfer clock signal Vϕ (a first clock signal) whose middle bias voltage (VM) is set to −1.0[V] from the output terminal of the vertical transfer clock power source switch circuit, while, for the light-exposing time period, a high level potential is applied to the second control terminal Cont2 to output a vertical transfer clock signal Vϕ (a second clock signal) whose middle bias voltage (MV) is set to 0[V] (see FIG. 2B). Thus, the level of dark signals may possibly be reduced without adversely affecting the amount of charge that can be handled by the vertical transfer unit and the vertical transfer efficiency of the vertical transfer unit.

Figure 5A:
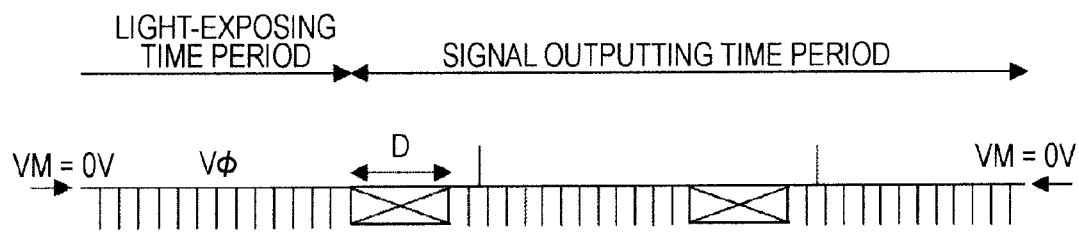
FIG. 5A is a schematic diagram (1) illustrating a vertical transfer clock signal $V\phi$.
Figure 5B:
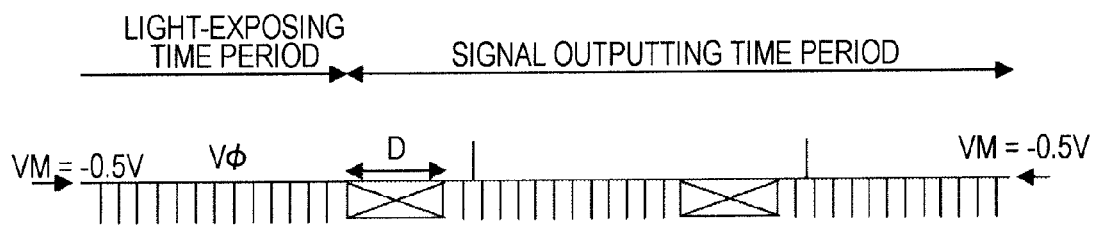
FIG. 5B is a schematic diagram (2) illustrating a vertical transfer clock signal $V\phi$.

That is, as in the example of the related dark signal level reducing technique as shown in FIG. 5B, in the case that a vertical transfer clock signal Vϕ has been negatively biased for the entire time period ranging from the light-exposing time period to the signal outputting time period, the amount of charge that can be handled by the vertical transfer unit and the vertical transfer efficiency of the vertical transfer unit may be reduced for the signal outputting time period. However, by limiting the time period for which the middle bias voltage (VM) of the vertical transfer clock signal Vϕ is negatively biased solely to the light-exposing time period, the increase in SN ratio owing to dark signal level reduction is expected without adversely affecting the amount of charge that can be handled by the vertical transfer unit and the vertical transfer efficiency of the vertical transfer unit attained for the signal outputting time period.

In the related dark signal level reducing technique, in consideration of adverse effect on the amount of charge that can be handled by the vertical transfer unit and the vertical transfer efficiency of the vertical transfer unit, the middle bias voltage (VM) of the vertical transfer clock signal Vϕ is negatively biased only to about −0.5[V]. However, according to the embodiment of the present invention, the time period for which the middle bias voltage (VM) of the vertical transfer clock signal Vϕ is negatively biased is limited solely to the light-exposing time period. As a result, it becomes unnecessary to consider the adverse effect on the amount of charge that can be handled by the vertical transfer unit and the vertical transfer efficiency of the vertical transfer unit and hence, for example, negative biasing of the middle bias voltage (VM) of the vertical transfer click signal Vϕ to about −1.0[V] may be possible.

Figure 5C:
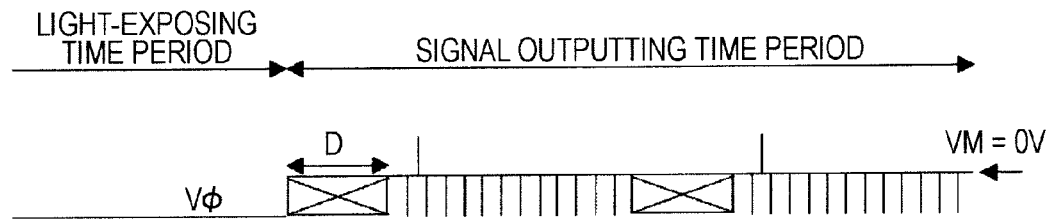
FIG. 5C is a schematic diagram (3) illustrating a vertical transfer clock signal $V\phi$.

As in the example of the related dark signal level reducing technique as shown in FIG. 5C, in the case that the potential of the vertical transfer clock signal Vϕ has been fixed at a low level for the light-exposing time period, vertical transfer of signal charges is not allowed for the light-exposing time period. However, in the CCD type camera to which the embodiment of the present invention is applied, the potential of the vertical transfer clock signal Vϕ is set to two levels, that is, a high level and a low level even for the light-exposing time period, so that even in the case that high-intensity light such as sunlight has been incident on the camera lens in a usual light-exposure mode, signal charges remaining in the vertical transfer unit are thoroughly swept in a predetermined time period (a time period for which unnecessary signal charges remaining upon light-exposure are swept) after the light-exposing time period has expired.

As described above, in the CCD type camera to which an embodiment of the present invention is applied, both dark signal level reduction and signal charge sweeping to be performed after the light-exposing time period has expired are attained. Thus, the technique of the present invention may be applied not only to a long-time light-exposing mode but also to a usual light-exposing mode.

In addition, vertical transfer of signal charges is allowed for the light-exposing time period. Thus, the technique of the present invention may be applied not only to a still image photographing mode, but also to the liquid crystal monitor image displaying mode and the moving image capturing mode necessitating high speed transfer of signal charges using a vertical transfer unit.

The present application contains subject matter related to that disclosed in Japanese Priority Patent Application JP 2008-124250 filed in the Japan Patent Office on May 12, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid state imaging apparatus comprising:
  a solid state imaging device having,
    light sensing units arrayed in a matrix,
    a vertical transfer unit provided for each vertical array of the light sensing units and configured to read out signal charges from said light sensing units and transfer the read-out signal charges in a vertical direction, and
    a horizontal transfer unit configured to receive the signal charges transferred from the vertical transfer unit and transfer the transferred signal charges in a horizontal direction; and
  a control circuit configured to control clock signals to be applied to the vertical transfer unit, wherein the control circuit performs control such that a first clock signal applied in order to transfer the signal charges for a time period from after a preceding signal charge has been read out from the light sensing unit to when the preceding signal charge is transferred to the horizontal transfer unit via the vertical transfer unit and a second clock signal applied for a time period from after the preceding signal charge has been transferred to the horizontal transfer unit to when a succeeding signal charge is read out from the light sensing unit, and a high level potential of the first clock signal is set higher than that of the second clock signal.

2. The solid state imaging apparatus according to claim 1, wherein the control circuit performs control so as to set the high level potential of the first clock signal to 0V and controls to set the high level potential of the second clock signal to −0.5V or less.

3. A method of driving a solid state imaging device having, light sensing units arrayed in a matrix, a vertical transfer unit provided for each vertical array of the light sensing units and configured to read out signal charges from the light sensing units and transfer the read-out signal charges in a vertical direction, and a horizontal transfer unit configured to receive the signal charges transferred from the vertical transfer unit and transfer the transferred signal charges in a horizontal direction, the method comprising:

applying a first clock signal to the vertical transfer unit in order to transfer the signal charges for a time period from after a preceding signal charge has been read out from the light sensing unit to when the preceding signal charge is transferred to the horizontal transfer unit via the vertical transfer unit and applying a second clock signal to the vertical transfer unit for a time period from after the preceding signal has been transferred to the horizontal transfer unit to when a succeeding signal charge is read out from the light sensing unit, wherein a high level potential of the first clock signal is set higher than that of the second clock signal.

4. A camera comprising:

a solid state imaging device having, light sensing units arrayed in a matrix, a vertical transfer unit provided for each vertical array of the light sensing units and configured to read out signal charges from the light sensing units and transfer the read-out signal charges in a vertical direction, and a horizontal transfer unit configured to receive the signal charges transferred from the vertical transfer unit and transfer the transferred signal charges in a horizontal direction;

an optical system configured to guide incident light to an image pickup area of the solid image pickup element; and a control circuit configured to control clock signals to be applied to the vertical transfer unit, wherein the control circuit performs control such that a first clock signal applied in order to transfer the signal charges for a time period from after a preceding signal charge has been read out from the light sensing unit to when the preceding signal charge is transferred to the horizontal transfer unit via the vertical transfer unit and a second clock signal applied for a time period after the preceding signal charge has been transferred to the horizontal transfer unit to when a succeeding signal charge is read out from the light sensing unit, and a high level potential of the first clock signal is set higher than that of the second clock signal.

* * * * *